(12) United States Patent
Makishima et al.

(10) Patent No.: US 8,773,714 B2
(45) Date of Patent: Jul. 8, 2014

(54) IMAGE FORMING APPARATUS

(75) Inventors: Shinji Makishima, Shizuoka-ken (JP);
Kazuhiro Ogura, Kanagawa-ken (JP);
Akihiro Mizutani, Shizuoka-ken (JP);
Toshihiro Ida, Shizuoka-ken (JP);
Yusuke Hamada, Shizuoka-ken (JP)

(73) Assignees: Kabushiki Kaisha Toshiba, Tokyo (JP);
Toshiba Tec Kabushiki Kaisha, Tokyo (JP)

( * ) Notice: Subject to any disclaimer, the term of this patent is extended or adjusted under 35 U.S.C. 154(b) by 309 days.

(21) Appl. No.: 13/169,131

(22) Filed: Jun. 27, 2011

(65) Prior Publication Data

US 2011/0317227 A1 Dec. 29, 2011

Related U.S. Application Data

(60) Provisional application No. 61/359,172, filed on Jun. 28, 2010.

(51) Int. Cl.
*H04N 1/04* (2006.01)

(52) U.S. Cl.
USPC ............ 358/1.9; 358/1.15; 358/474; 358/505

(58) Field of Classification Search
USPC ................... 358/1.9, 1.15, 474, 505
See application file for complete search history.

(56) References Cited

U.S. PATENT DOCUMENTS

2006/0203274 A1* 9/2006 Hirose ................. 358/1.13
2008/0072334 A1* 3/2008 Bailey et al. ............. 726/28

* cited by examiner

*Primary Examiner* — Houshang Safaipour
(74) *Attorney, Agent, or Firm* — Amin, Turocy & Watson, LLP

(57) ABSTRACT

According to one embodiment, an image forming apparatus includes a scanner, a setting unit, and a control unit. The scanner is configured to read a document. The setting unit is configured to receive an instruction to append a display image to a signature field of a PDF. The control unit is configured to generate the PDF by appending the display image to the signature field, for the document.

11 Claims, 7 Drawing Sheets

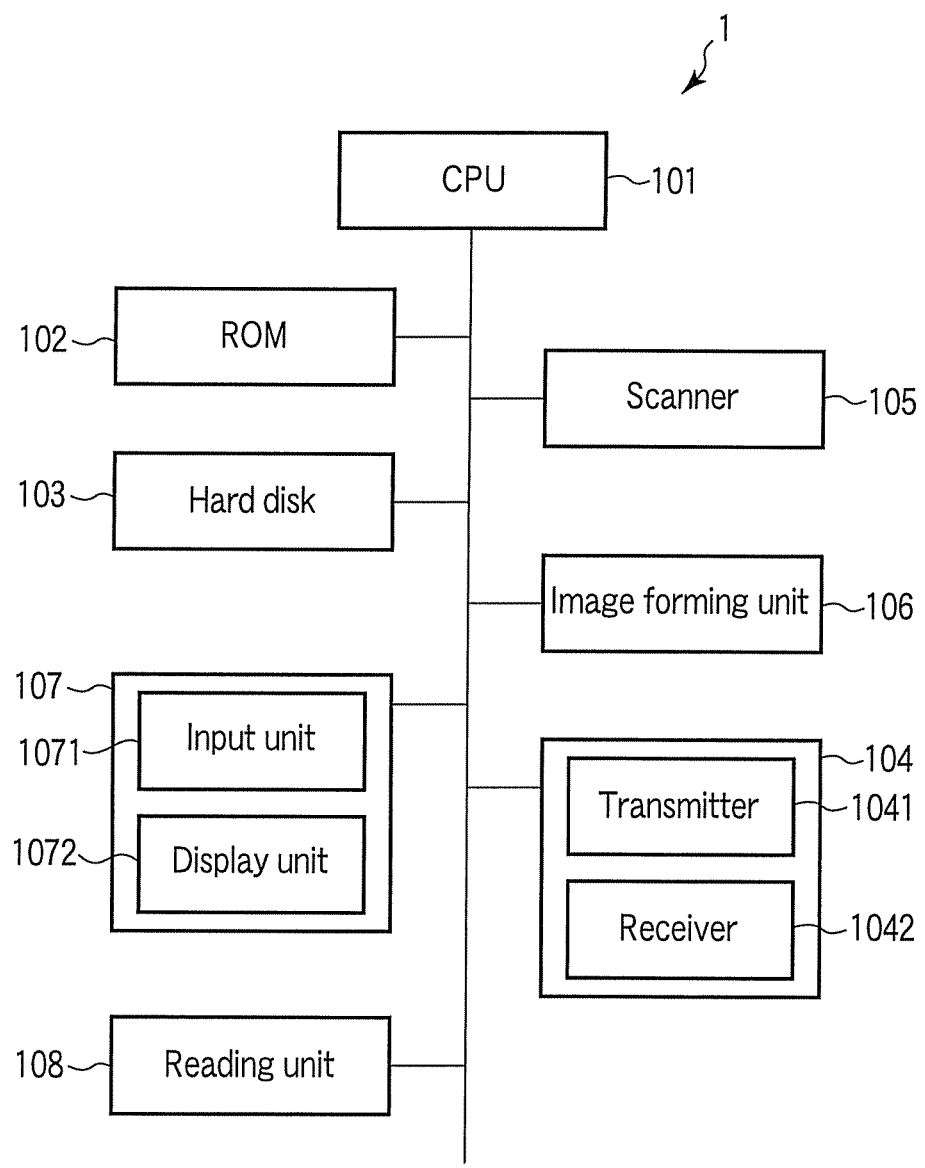
F I G. 1

F I G. 4
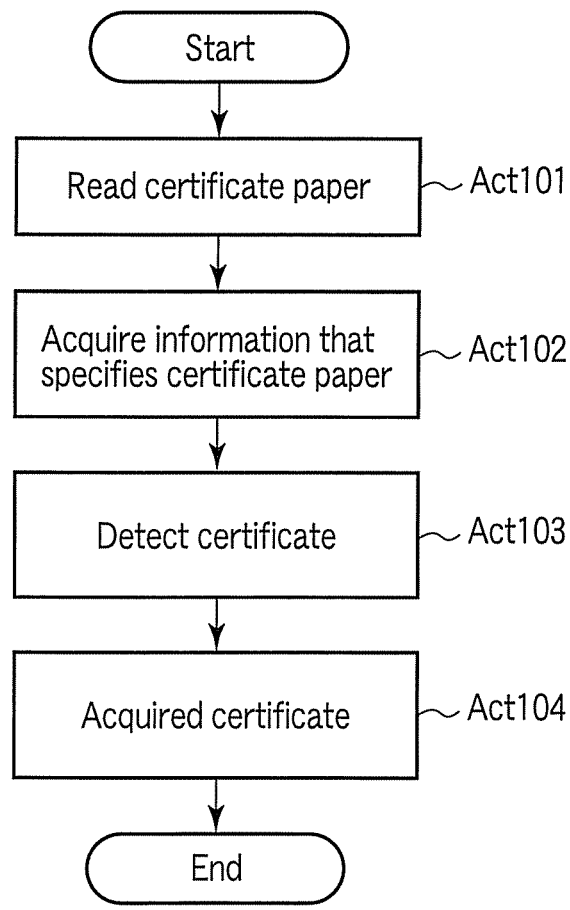
F I G. 5

US 8,773,714 B2

IMAGE FORMING APPARATUS

CROSS-REFERENCE TO RELATED APPLICATIONS

This application is based upon and claims the benefit of priority from Provisional Application No. 61/359,172, filed on Jun. 28, 2010, the entire contents of which are incorporated herein by reference.

FIELD

Embodiments described herein relate generally to an image forming apparatus that appends a digital signature to an electronic file.

BACKGROUND

A method of appending a digital signature based on a public key encryption system to an electronic file is widely used in order to prevent data from being altered by a third person when transmitting the electronic file to a receiver through a network is widely used. A user transmits an electronic certificate containing unique information, such as a public key and the user's name, to the receiver, with electronic data that is encoded with a private key and appended with the digital signature. The receiver can acquire the original electronic data by decoding the encoded electronic data using the public key contained in the electronic certificate. The identification of the transmitter of the electronic file and the authenticity (originality) of the electronic file can be ensured using the digital signature and the electronic certificate.

Further, in general, PDFs are provided with a digital signature function. The user can designate a desired area in the document and embed a signature form signature and a signature filed. The signature form makes it possible to verify the signature or display a window that displays the contents of an electronic certificate used for the signature, for example, by clicking a mouse. The signature field makes it possible to attach a display image and a handwritten signature, a company logo, and a photo, in order to shows the signee's information in more detail.

An image forming apparatus can append a digital signature to an electronic file generated using scan-to-PDF. However, the PDFs cannot have information on the signee appended in the signature field.

BRIEF DESCRIPTION OF THE DRAWINGS

FIG. 1 is a block diagram showing an image forming apparatus of an embodiment.

FIG. 4 is a diagram showing a certificate paper of an embodiment.

FIG. 5 is a flowchart showing an acquisition process of an embodiment.

DETAILED DESCRIPTION

Figure 2:
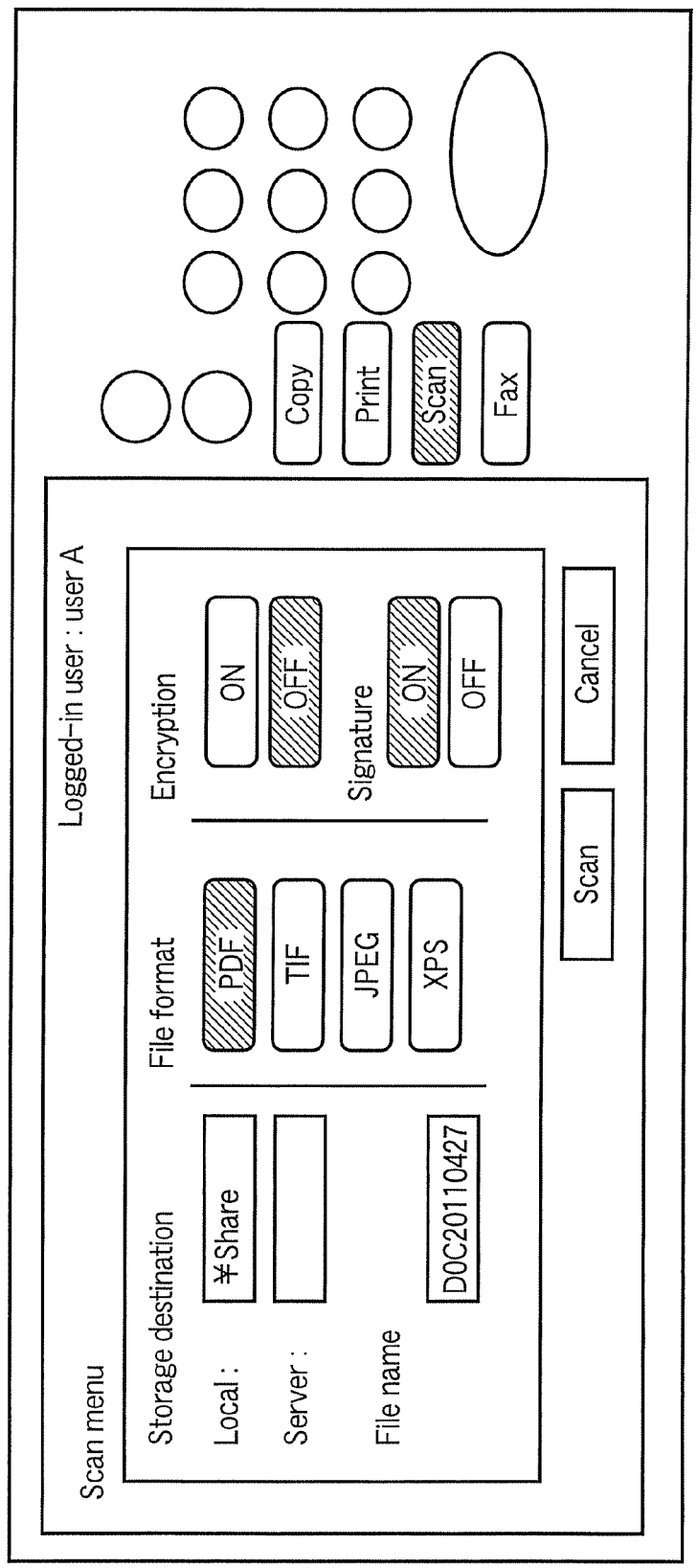
FIG. 2 is a diagram showing a scan setting screen of an embodiment.

In general, according to one embodiment, an image forming apparatus includes a scanner, a setting unit, and a control unit. The scanner is configured to read a document. The setting unit is configured to receive an instruction to append a display image to a signature field of a PDF. The control unit is configured to generate the PDF by appending the display image to the signature field, for the document.

Hereinafter, the embodiment will be described with reference to the drawings. FIG. 1 is a block diagram showing an image forming apparatus 1. In the embodiment, an MFP (Multi Function Peripheral) will be described as an example of the image forming apparatus 1. The image forming apparatus 1 includes a CPU 101, a ROM 102, a hard disk (memory) 103, a communicating unit 104, a scanner 105, an image forming unit 106, a control panel 107, and a reading unit 108. The CPU 101 controls the operation of the components of the image forming apparatus 1. The ROM 102 stores various programs that are executed by the CPU 101. The hard disk 103 stores a variety of data. The communicating unit 104 connects the image forming apparatus 1 to a network. The communicating unit 104 includes a transmitter 1041 and a receiver 1042. The transmitter 1041 transmits information to another apparatus through the network. For example, the transmitter 1041 transmits electronic data stored on the hard disk 103 to another apparatus. The receiver 1042 receives information from another apparatus through the network. For example, the receiver 1042 receives a print job from another apparatus.

The scanner 105 reads image information from a document and converts the information into electronic data. The image forming unit 106 prints the image information based on the print job or the image information read by the scanner 105 onto a piece of paper. The control panel 107 integrally includes a display unit 1071 and an input unit (setting unit) 1072. The display unit 1071 is a liquid crystal monitor that displays a variety of information. The input unit 1072 includes hard keys making it possible to select (input) necessary items and a touch panel of the display unit 1071. The CPU 101 receives a selection from a user through the input unit 1072 and performs the follow process in accordance with the programs stored in the ROM 102. The reading unit 108 reads information from an IC card, for logging in the image forming apparatus 1.

FIG. 2 is a block diagram showing a scan setting screen that is displayed on the display unit 1071. It is assumed that a user logs in by using the input unit 1072 or placing the IC card to the reading unit 108. When a user sets a document on the scanner 105 and selects scanning with a predetermined hard key of the control panel 107, the CPU 101 displays a scan setting screen on the display unit 1072, as shown in FIG. 2. The CPU 101 displays detailed settings about the items, a "storage destination", a "file name", a "file format", "encryption", and a "signature" to be selectable, on the scan setting screen. The user sets the items for the electronic data of the document read by the scanner 105.

In the item "storage destination", the storage destination of the electronic data can be set by the touch panel. In the item "file name", the file name of the electronic data can be set using the touch panel. In the item "file format", the file format (PDF, TIF, JPEG, XPS) of the electronic data can be set using the touch panel. In the item "encryption", whether encryption of the electronic data is performed can be set by the touch panel. In the item "signature", the ON/OFF state of a digital signature for the electronic data of the document can be set using the touch panel. In the embodiment, when the user selects PDF for the "file format" and digital signature-ON for the item "signature" is described.

Figure 3:
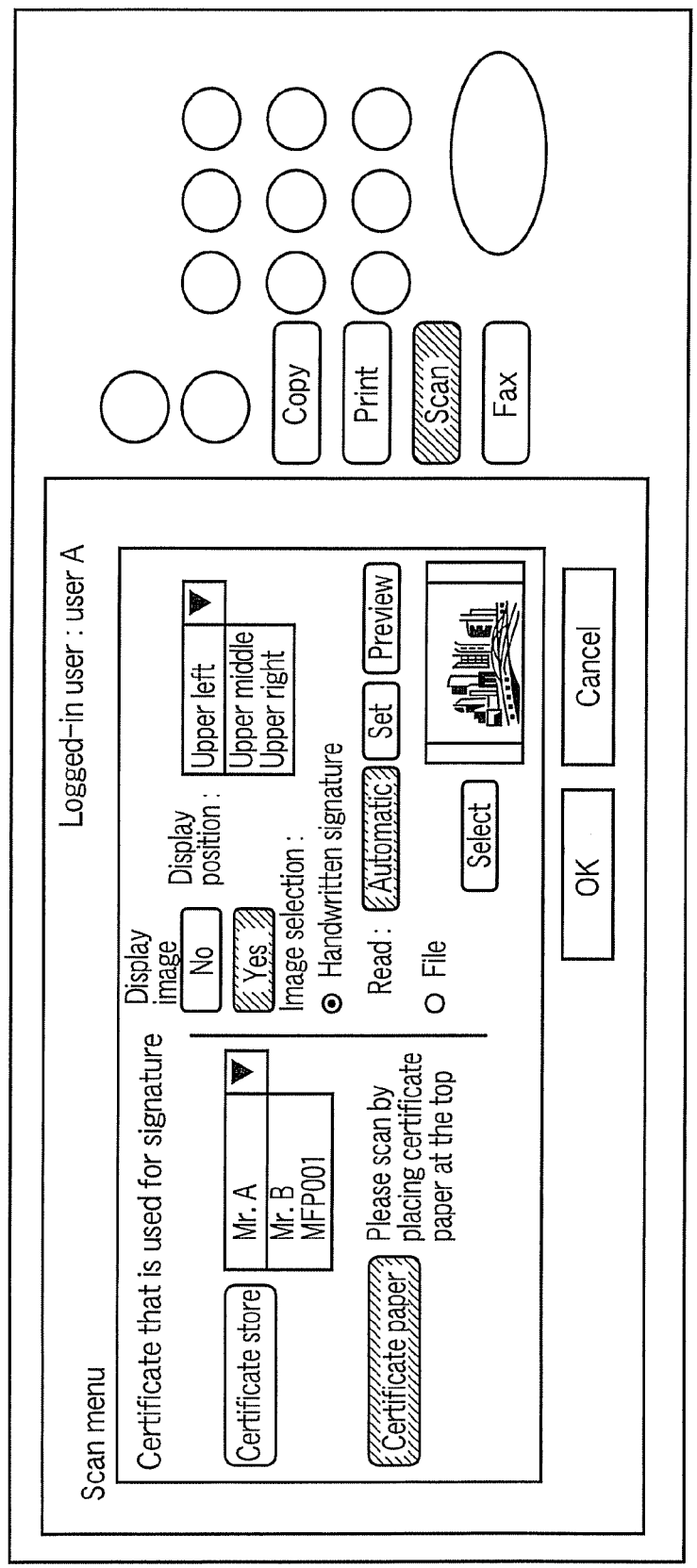
FIG. 3 is a diagram showing a signature setting screen of an embodiment.

FIG. 3 is a diagram showing a signature setting screen that is displayed on the display unit 1072. When the user sets the digital signature-ON with the item "signature" on the scan setting screen shown in FIG. 2, the CPU 101 displays the signature setting screen shown in FIG. 3 on the display unit 1072. The CPU 101 displays detailed settings about the items of an item "certificate with signature" and an item "display image" to be selectable on the signature setting screen. The user sets the items in detail, for the electronic data of the document read by the scanner 105. In the item "certificate with signature", an electronic certificate (hereafter, briefly referred to as a certificate) used for digital signature can be set. In the item "display image", whether to append a display image as information on the signee to the signature field of the PDF can be set.

First, detailed settings about the item "certificate with signature" are described. In the item "certificate with signature", one of the "certificate store" key and the "certificate paper" key can be selected.

The "certificate store" key is provided to select a certificate that is used for digital signature from a certificate store. When the user selects the "certificate store" key, the CPU 101 searches certificates stored in the certificate store installed on an area of the hard disk 103 and displays the list of the certificates in a list box. Further, when user logs in by placing the IC card to the reading unit 108, the CPU 101 may search the certificates stored in a certificate store in the IC card and display the list of the certificates in the list box. The user can select a desired certificate from the list box, using the touch panel. The CPU 101 designates the selected certificate as a certificate that is used for the digital signature.

The "certificate paper" key is provided to designate a certificate that is used for the digital signature, using a sheet of certificate paper (instruction sheet). FIG. 4 is a diagram showing an example of certificate paper of an embodiment.

Information that specifies the certificate is embedded in the certificate paper using a fingerprint, a QR code, or a pattern image. The information that specifies the certificate is generally a serial number of the certificate and the name of the publisher.

A plurality of certificate paper sheets is placed at a side of the image forming apparatus 1. The certificate paper sheets are classified for an individual, a group, and an image forming apparatus used for device signature, in accordance with the use. Information that specifies the certificates are embedded on the certificate paper sheets. The certificate paper sheets may be implemented such that a signature can be written with a hand at predetermined positions, as shown in FIG. 4.

FIG. 5 is a flowchart showing acquiring a certificate, based on the certificate paper. In this process, the user selects the item "certificate paper" and sets a document with the certificate paper at the top on the scanner 105. The CPU 101 controls the scanner 105 to read the certificate paper (Act 101) and then acquires information that specifies a certificate from the certificate paper (Act 102). In Act 102, the CPU 101 reads the information that specifies the certificate by scanning the certificate paper placed at the top of the document, using the scanner 105. The CPU 101 searches for a certificate corresponding to the information that specifies the certificate from the certificate store (Act 103). In Act 103, the CPU 101 searches for a certificate corresponding to the information that specifies the certificate from the certificate store installed in the area of the hard disk 103 or the certificate store in the IC card used for logging in. Further, the CPU 101 acquires the certificate corresponding to the information that specifies the certificate from the certificate store (Act 104). The CPU 101 designates the certificate acquired by the flow shown in FIG. 5 as the certificate that is used for the digital signature. Further, the CPU 101 may acquire the certificate in accordance with the color of the certificate paper or fingerprints, in addition to the information that specifies the certificate. In this case, the hard disk 103 may store the information that matches the certificate with the color of the certificate paper and the pattern, such as fingerprints.

Next, detailed settings about the item "display image" are described. In the item "display image", one of the keys "presence" or "absence" of the "image display" can be selected using the touch panel. When the user selects the key "absence" of the "display image", the CPU 101 does not receive other detailed settings about the item "display image". When the user selects the key "presence" of the "display image", the CPU 101 receives the detailed settings about the item "display position" and the item "image selection". In the item "display position", an approximate display position (upper left, upper middle, or upper right of a document) of a display image can be selected from the list box using the touch panel. Further, the CPU 101 may display a screen for designating the display position of a display image in detail by dragging on the touch panel, on the display unit 1071. The user can designate in detail the display position of the display image in the document by dragging.

In the item "image selection", one of the item "handwritten signature" and the item "file" can be selected using the touch panel, as selection of an image that is used for the display image. In the item "handwritten signature", a method of specifying read position of the image of the handwritten signatures written at any portion on the document. In the item "file", the image stored on the hard disk 103 can be selected.

First, detailed settings about the item "handwritten signature" is described. In the "handwritten signature", as a method of specifying the read positions of the image of the "handwritten signature", one of a "automatic" key, a key "set", and a "preview" key can be selected.

The "automatic" key is provided to cut an image at a position determined in advance by CPU 101, as the image around the middle of the last page of the document, for example. Further, when user selects the "certificate paper" key and the "automatic" key in the item "certificate that is used for signature" of the signature setting screen, the CPU 101 may cut the image at the position of the handwritten signature of the certificate paper as the display image. Further, when user selects the "certificate paper" key in the item "certificate that is used for signature" of the signature setting screen, the CPU 101 may cut the image at the position of the handwritten signature of the certificate paper as the display image, without receiving the detailed settings about the item "image selection".

Figure 6:
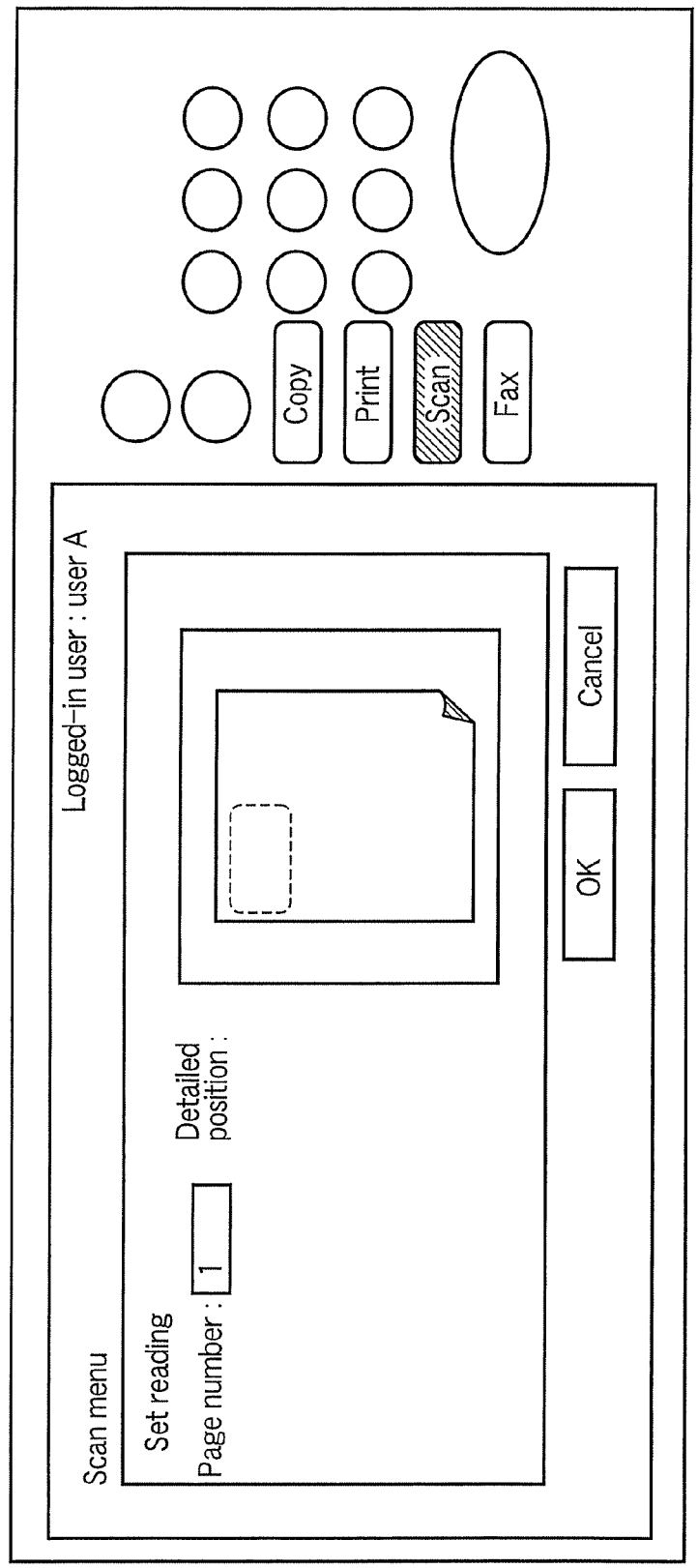
FIG. 6 is a diagram showing a position setting screen of an embodiment.

The "set" key is provided to permit the user to designate the detailed position of the image cut by the CPU 101, before the scanner 105 reads the document. When the user selects the key "set", the CPU 101 displays the position setting screen on the display unit 1071. FIG. 6 is a diagram showing a position setting screen that is displayed on the display unit 1072. On the position setting screen, the user can designate the number of pages of the image cut by the CPU 101, the detailed position of the page, and the size, in the document (certificate paper may be included) by dragging on the touch panel. The CPU 101 receives designation of the detailed position on the position setting screen.

Figure 7:
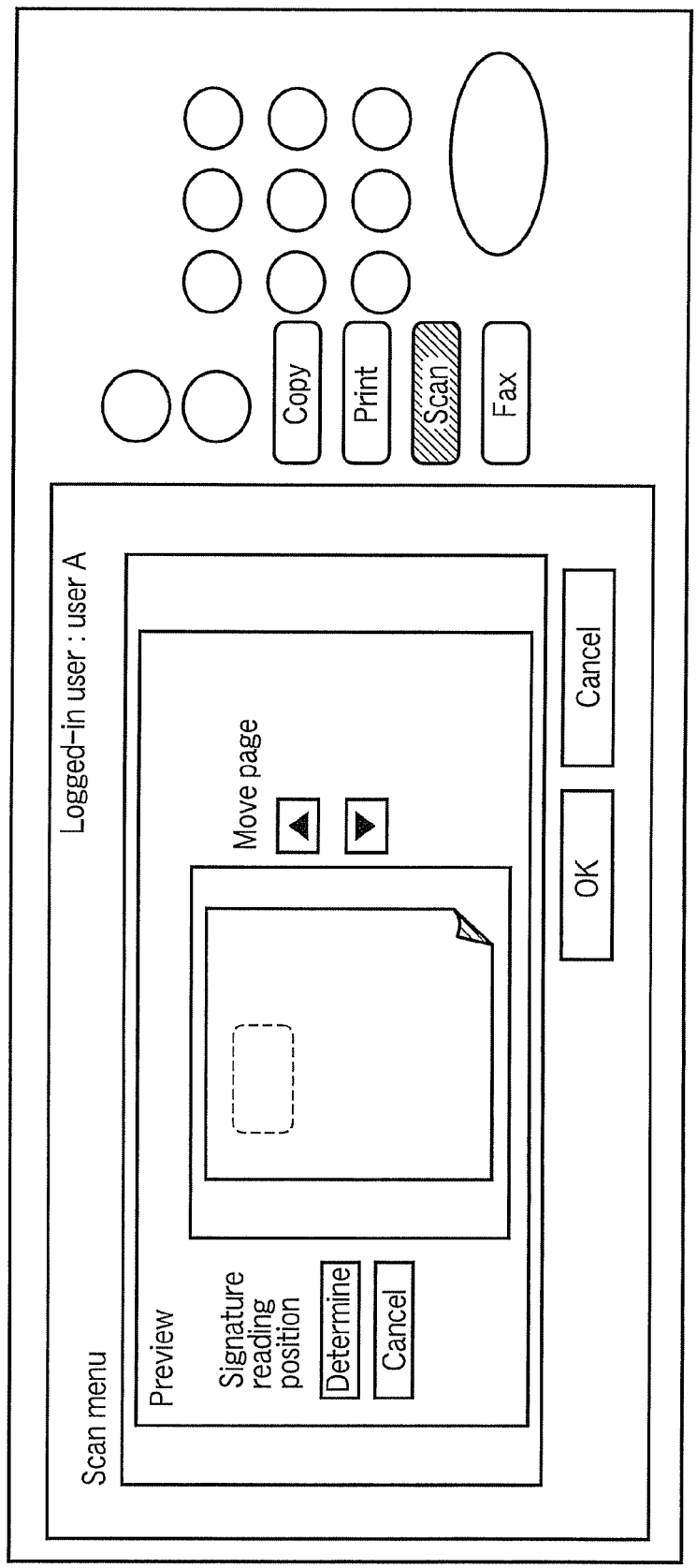
FIG. 7 is a diagram showing a preview screen of an embodiment.

The "preview" key is provided to permit the user to designate of the detailed position of the image cut by the CPU 101, before the scanner 105 writes on the electronic file after reading the document. When the user selects the "preview" key, the CPU 101 displays a preview screen on the display unit 1071. FIG. 7 is a diagram showing a preview screen displayed on the display unit 1072. The user can designate the number of pages of the image cut by the CPU 101, the detailed position of the page, and the size, in the document (certificate paper may be included) by dragging on the touch panel, on the preview screen. The CPU 101 receives designation of the detailed position on the preview screen.

The CPU 101 cuts the image of the handwritten signature from the electronic data of the document read by the scanner 105, on the basis of setting in the item "handwritten signature", and sets the image as the display image. Further, the image cut by the CPU 101 as the display image from the electronic data of the document read by the scanner 105 is not limited to the handwritten signature. For example, the image may be an image on an employee ID card at the last page of the document or an arbitrary image printed in the document. The user may select any key in the item "handwritten signature", if the user wants to set those images as the display image.

Next, detailed settings about the item "file" are described. In the item "file", the desired image stored on the hard disk 103 can be selected from the list box by the touch screen. When the user selects a desired image stored on the hard disk 103 by selecting the item "file", the CPU 101 reads the selected image from the hard disk 103 and displays the image on the display unit 1071. The CPU 101 sets the selected image in the item "file" as the display image.

Figure 8:
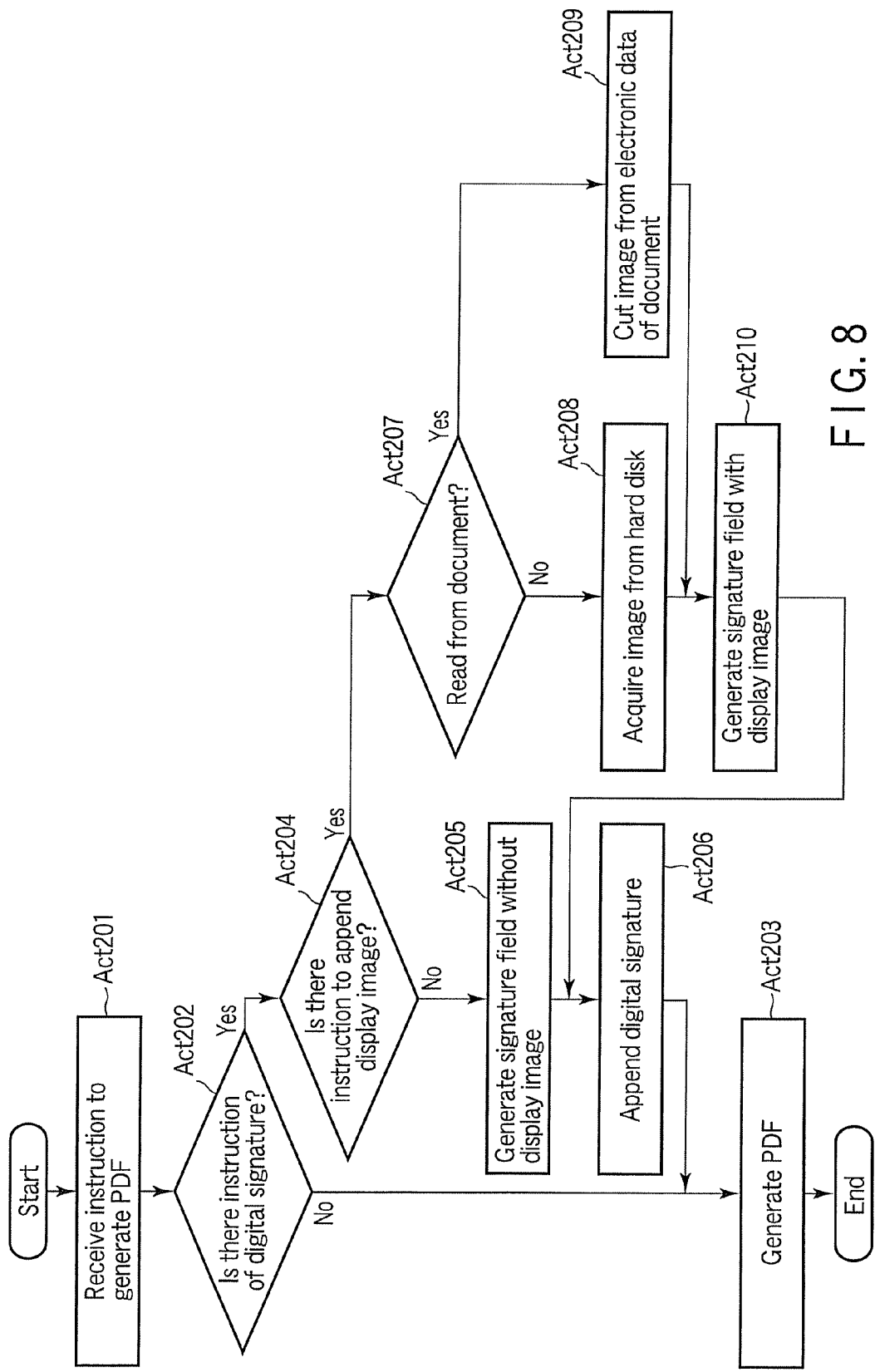
FIG. 8 is a flowchart showing generating a PDF of an embodiment.

When the user sets detailed settings about the items on the scan setting screen shown in FIG. 2 and then selects an OK key (start scan-to-PDF), using the touch panel, the CPU 101 starts generating a PDF of the document on the basis of the contents set by the user. FIG. 8 is a flowchart showing generating a PDF based on the detailed settings about the items on the scan setting screen shown in FIG. 2. The CPU 101 receives first an instruction to generate a PDF (Act 201). In Act 201, the CPU 101 receives an instruction to generate a PDF on the basis of selection of starting scan-to-PDF. Next, the CPU 101 determines whether there is an instruction of a digital signature (Act 202). In Act 202, the CPU 101 determines whether the digital signature setting is on in the item "signature", on the scan setting screen.

When there is no instruction of digital signature (No, in Act 202), the CPU 101 generates a PDF (Act 203). In Act 203, the CPU 101 generates a PDF that does not have a digital signature appended, for the document read by the scanner 105. The CPU 101 stores the PDF on the hard disk 103.

When there is an instruction of a digital signature (Yes in Act 202), the CPU 101 determines whether there is an instruction to append the display image to the signature field (Act 204). In Act 204, the CPU 101 determines whether "Yes" is selected in the item "display image in the signature setting screen. When there is no instruction to append the display image (No in Act 204), the CPU 101 generates a signature field without a display image (Act 205). In Act 205, the CPU 101 may append the default image to the signature field. The CPU 101 appends the digital signature to the signature field (Act 206). Thereafter, the CPU 101 generates a PDF have a digital signature appended in the signature field without a display image, in the document read by the scanner 105 in Act 203. The CPU 101 stores the PDF on the hard disk 103.

When there is an instruction to append the display image (Yes in Act 204), whether there is an instruction to read the display image from the document is determined (Act 207). In Act 207, the CPU 101 determines whether the item "handwritten signature" is selected in the item "image selection" in the signature setting screen. When there is no instruction to read the display image from the document (No in Act 207), the CPU 101 acquires an image from the hard disk 103 (Act 208). In Act 208, the CPU 101 determines that the item "file" is selected in the item "image selection" on the signature setting screen. The CPU 101 acquires an image selected in the item "file" from the hard disk 103 and sets the image as the display image.

When there is an instruction to read the display image from the document (Yes in Act 207), the CPU 101 cuts the image from the document (Act 209). In Act 209, the CPU 101 cuts the image from the document read by the scanner 105 on the basis of the setting the item "handwritten signature". The CPU 101 sets the cut image as the display image. Further, the CPU 101 may delete the cut image from the electronic data of the document.

Next, the CPU 101 generates a signature field with the display image (Act 210). In Act 210, the CPU 101 appends the display image acquired in Act 208 or Act 208 to the signature field. Thereafter, the CPU 101 appends the digital signature to the signature field in Act 206. Thereafter, the CPU 101 generates a PDF having a digital signature appended in the signature field with the display image, in the document read by the scanner 105 in Act 203. The CPU 101 stores the PDF on the hard disk 103.

According to the embodiment, information on desired signee to the signature field by selection of the user. Therefore, the person who receives the PDF can know the signee only by checking the signature field. Further, the user may not select a certificate on the control panel by using the certificate paper.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:
a scanner configured to read a document;
a setting unit configured to receive an instruction to append a display image to a signature field of a PDF;
a control unit configured to generate the PDF by appending the display image to the signature field, for the document, wherein the setting unit receives the instruction to append the display image based on an instruction with a digital signature to the PDF and wherein the setting unit receives selection of an electronic certificate which is used for the digital signature based on the instruction with the digital signature; and
a display unit configured to display a setting screen for a generation of the PDF wherein the display unit displays a list of one or more electronic certificates stored in a certificate store.

2. An image forming apparatus, comprising:
a scanner configured to read a document;
a setting unit configured to receive an instruction to append a display image to a signature field of a PDF; and
a control unit configured to generate the PDF by appending the display image to the signature field, for the document wherein the setting unit receives the instruction to append the display image based on an instruction with a digital signature to the PDF. wherein the setting unit receives selection of an electronic certificate which is used for the digital signature based on the instruction with the digital signature, wherein the control unit acquires the electronic certificate from a certificate store, and wherein the control unit acquires the electronic certificate based on a piece of certificate paper read by the scanner.

3. The apparatus of claim 2, further comprising a memory configured to have the certificate store which stores one or more electronic certificates.

4. The apparatus of claim 2,
wherein the certificate store is in an IC card used for logging in.

5. The apparatus of claim 2,
wherein the certificate paper includes information which specifies a first electronic certificate and another certificate paper different from the electronic certificate paper includes information which specifies a second electronic certificate.

6. A method, comprising:
receiving the instruction to append a display image based on an instruction with a digital signature to the PDF;
receiving an instruction to append a display image to a signature field of a PDF;
reading a document;
generating the PDF by appending the display image to the signature field, for the document;
receiving selection of an electronic certificate which is used for the digital signature based on the instruction with the digital signature;
acquiring the electronic certificate from a certificate store; and
acquiring the electronic certificate based on a piece of certificate paper read by the scanner.

7. The method of claim 6, further comprising:
the certificate store which stores one or more electronic certificates.

8. The method of claim 6,
wherein the certificate store is in an IC card used for logging in.

9. The method of claim 6, further comprising:
displaying a setting screen for a generation of the PDF.

10. The method of claim 9, further comprising:
displaying a list of one or more electronic certificates stored in a certificate store.

11. The apparatus of claim 6,
wherein the certificate paper includes information which specifies a first electronic certificate and another certificate paper different from the electronic certificate paper includes information which specifies a second electronic certificate.

* * * * *